US007986826B2

(12) United States Patent
Li et al.

(10) Patent No.: US 7,986,826 B2
(45) Date of Patent: Jul. 26, 2011

(54) METHOD AND SYSTEM FOR CORRECTION OF FLUOROSCOPE IMAGE DISTORTION

(75) Inventors: Dun Alex Li, Salem, NH (US); Joseph Casey Crager, Newton, MA (US); Peter Kelley, Hampton Falls, NH (US); Andrey Litvin, Waltham, MA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/014,579

(22) Filed: Jan. 26, 2011

(65) Prior Publication Data

US 2011/0116693 A1 May 19, 2011

Related U.S. Application Data

(62) Division of application No. 11/766,455, filed on Jun. 21, 2007.

(51) Int. Cl.
*G06K 9/00* (2006.01)

(52) U.S. Cl. ........ 382/154; 382/181; 382/189; 382/197; 382/214; 382/274; 600/424; 600/429; 600/411; 600/417

(58) Field of Classification Search .................. 382/154, 382/181, 189, 197, 214, 274; 600/424, 429, 600/411, 417
See application file for complete search history.

(56) References Cited

U.S. PATENT DOCUMENTS 4,188,640 A 2/1980 Dittrich
4,764,944 A 8/1988 Finlayson
4,945,223 A 7/1990 Beauzamy
5,757,118 A 5/1998 Kubo
6,677,956 B2 * 1/2004 Raskar et al. ................ 345/581
6,960,879 B2 11/2005 Koch
7,450,748 B2 * 11/2008 Badger et al. ................ 382/144

OTHER PUBLICATIONS

Roger Tsai, "A versatile camera calibration technique for high-accuracy 3D machine vision metrology using off-the-shelf TV cameras and lenses," IEEE Journal of Robotics and Automation, vol. RA-3, No. 4, 1987.

* cited by examiner

*Primary Examiner* — Matt Bella
*Assistant Examiner* — Mike Rahmjoo
(74) *Attorney, Agent, or Firm* — McAndrews, Held & Malloy, Ltd.; Michael A. Dellapenna

(57) ABSTRACT

Certain embodiments of the present invention provide for a system and method for modeling S-distortion in an image intensifier. In an embodiment, the method may include identifying a reference coordinate on an input screen of the image intensifier. The method also includes computing a set of charged particle velocity vectors. The method also includes computing a set of magnetic field vectors. The method also includes computing the force exerted on the charged particle in an image intensifier. Certain embodiments of the present invention include an iterative method for calibrating an image acquisition system with an analytic S-distortion model. In an embodiment, the method may include comparing the difference between the measured fiducial shadow positions and the model fiducial positions with a threshold value. If the difference is less than the threshold value, the optical distortion parameters are used for linearizing the set of acquired images.

4 Claims, 7 Drawing Sheets

METHOD AND SYSTEM FOR CORRECTION OF FLUOROSCOPE IMAGE DISTORTION

RELATED APPLICATIONS

The present application is a division of U.S. patent application Ser. No. 11/766,455, entitled "Method and System for Correction of Fluoroscope Image Distortion," filed Jun. 21, 2007, which is hereby incorporated by reference in its entirety.

BACKGROUND OF THE INVENTION

The present invention generally relates to a system and method for improving the navigation accuracy of an electromagnetic navigation system for use with medical applications. Particularly, the present invention relates to a system and method for improving the calibration of a fluoroscope camera by compensating for the S-distortion.

Electromagnetic type navigation systems are useful in numerous applications. One application of particular use is in medical applications, and more specifically, image guided surgery. Typical image guided surgical systems acquire a set of images of an operative region of a patient's body and track a surgical tool or instrument in relation to one or more sets of coordinates. At the present time, such systems have been developed or proposed for a number of surgical procedures such as brain surgery and arthroscopic procedures on the knee, wrist, shoulder or spine, as well as certain types of angiography, cardiac or other interventional radiological procedures and biopsies. Such procedures may also involve preoperative or intraoperative x-ray images being taken to correct the position or otherwise navigate a tool or instrument involved in the procedure in relation to anatomical features of interest. For example, such tracking may be useful for the placement of an elongated probe, radiation needle, fastener or other article in tissue or bone that is internal or is otherwise positioned so that it is difficult to view directly.

An electromagnetic tracking system may be used in conjunction with an x-ray system. For example, an electromagnetic tracking system may be used in conjunction with a C-arm fluoroscope. The C-arm fluoroscope may utilize an x-ray source at one end of the C-arm and an x-ray detector, or camera, at the other end of the C-arm. The patient may be placed between the x-ray source and the x-ray detector. X-rays may pass from the x-ray source, through the patient, to the x-ray detector where an image is captured. The electromagnetic tracking system may generate an electromagnetic field between the ends of the C-arm and penetrate the body with minimal attenuation or change so tracking may continue during a surgical procedure.

Part of the X-ray detector may include an X-ray image intensifier device (IID). The function of the IID in the fluoroscopic imaging system is to convert the x-ray spectrum transmitted through the patient into a highly visible image. The image is produced by converting the x-ray photons into light photons at the image intensifier input phosphor, converting the visible light photons into electrons at the photocathode, accelerating and focusing the electrons through use of electrodes, and finally, converting the electrons back into visible light at the output phosphor. The intensity of the final image is several thousand times brighter than the initial image created at the input phosphor. The IID allows for lower x-ray doses to be used on patients by magnifying the intensity produced in the output image, allowing the viewer to more easily see the structure of the object being imaged.

In general, there are a variety of imperfections in IIDs, including pincushion distortion and S-distortion. Pincushion distortion is at least partially caused by the mapping of electrons from the curved input surface to a flat output screen. The mapping from a curved surface to a flat surface may cause larger magnification at the image periphery as compared to the center. S-distortion associated with the IIDs is at least partially caused by the magnetic field effect of the earth on the paths of the moving electrons within the IID. The resulting distortion usually has a characteristic "S" shape. For example, electrons within the IID move in paths along designated lines of flux. External electromagnetic sources, such as the earth's electromagnetic field, affect electron paths at the perimeter of the image intensifier more so than those nearer the center. This characteristic causes the image in a fluoroscopic system to distort with an S shape. Since the magnitude of the earth's magnetic field varies as the IID's position is changed, the S-distortion pattern may vary.

One technique that has been used to address the variances of the S-distortion pattern is to arrange the mu-metal shield to reduce the residual earth magnetic fields inside the IID tube. Such an arrangement may include adding an active coil to the IID to compensate for the earth's magnetic field or introducing a distortion sensing mechanism in conjunction with the active compensation coil to dynamically correct the actual distortion. These techniques are generally not sufficient for use with 3D imaging or navigation purposes.

Another technique that has been used to address the variances of the S-distortion pattern is to perform calibration. Calibration may be performed off-line or online. The off-line calibration may be used for the fixed room or mobile C-arm with repeatable motion control. The disadvantage of off-line calibration is that it the C-arm is generally non-mobile. The online calibration use a calibration target embedded with fiducial markers. One disadvantage of the on-line calibration technique is a potential high sensitivity to miss-detection of the fiducial shadow that may be obscured by patient anatomy or the surgical table.

Accordingly, a system and method is needed to better address the variances of the S-distortion. Such a system and method may improve navigation system accuracy as well as reduce the camera calibration re-projection error.

SUMMARY OF THE INVENTION

Certain embodiments of the present invention may include a method for modeling S-distortion in an image intensifier. The method may include identifying a reference coordinate on an input screen of the image intensifier. The z axis intersects the reference coordinate and is perpendicular to the input screen at the location of the reference coordinate, and wherein the x axis intersects the reference coordinate and is perpendicular to the z axis, and wherein the y axis intersects the reference coordinate and is perpendicular to the x axis. The method may also include computing a set of charged particle velocity vectors. The charged particle velocity vectors include a first component for the velocity of a charged particle along the z-axis and a second component for the velocity of a charged particle in an x-y plane that is along the x-axis and y-axis. The method may also include computing a set of magnetic field vectors. The magnetic field vectors include a first component for the magnetic field within the image intensifier along the z-axis, a second component for the magnetic field within the image intensifier along the x-axis, and a third component for the magnetic field within the image intensifier along the y-axis. The method may also include computing the force exerted on the charged particle in the image intensifier along the x-y plane using at least the set of charged particle velocity vectors and the set of magnetic field vectors.

Certain embodiments of the present invention may also include a method for calibrating an image acquisition system with an analytic S-distortion model. The method may include acquiring a set of images, wherein the images include patient anatomy and fiducial markers embedded within a calibration target. The method may also include processing the images to obtain measured fiducial markers shadow positions in imaging plane coordinates. The method may also include estimating image acquisition system intrinsic parameters, image acquisition system extrinsic parameters, and optical distortion parameters based on the measured fiducial markers shadow positions. The method may also include computing a set of model fiducial markers positions in an imaging plane based on the estimated image acquisition system intrinsic parameters and image acquisition system extrinsic parameters. The method may also include correcting for the S-distortion of the measured fiducial markers shadow positions. The method may also include computing the difference between the measured fiducial markers shadow positions and the model fiducial positions. The method may also include comparing the difference between the measured fiducial shadow positions and the model fiducial positions with a threshold value, if the difference is greater than the threshold value, the image acquisition system intrinsic parameters, the image acquisition system extrinsic parameters, and the optical distortion parameters are updated and used as input in the next iteration cycle. The method may also include if the difference is less than the threshold value, the optical distortion parameters are used for linearizing the set of acquired images.

Certain embodiments of the present invention may include a computer readable medium having a set of instructions for execution by a computer. The set of instructions may include an identification routine for identifying a reference coordinate on an input screen of the image intensifier, wherein the z axis intersects the reference coordinate and is perpendicular to the input screen at the location of the reference coordinate, and wherein the x axis intersects the reference coordinate and is perpendicular to the z axis, and wherein the y axis intersects the reference coordinate and is perpendicular to the x axis. The set of instructions may also include a first computation routine for computing a set of charged particle velocity vectors, the charged particle velocity vectors including a first component for the velocity of a charged particle along the z-axis and a second component for the velocity of a charged particle in an x-y plane that is along the x-axis and y-axis. The set of instructions may also include a second computation routine for computing a set of magnetic field vectors, said magnetic field vectors including a first component for the magnetic field within the image intensifier along the z-axis, a second component for the magnetic field within the image intensifier along the x-axis, and a third component for the magnetic field within the image intensifier along the y-axis. The set of instructions may also include a third computation routine for computing the force exerted on the charged particle in the image intensifier along the x-y plane using at least the set of charged particle velocity vectors and the set of magnetic field vectors.

Figure 1:
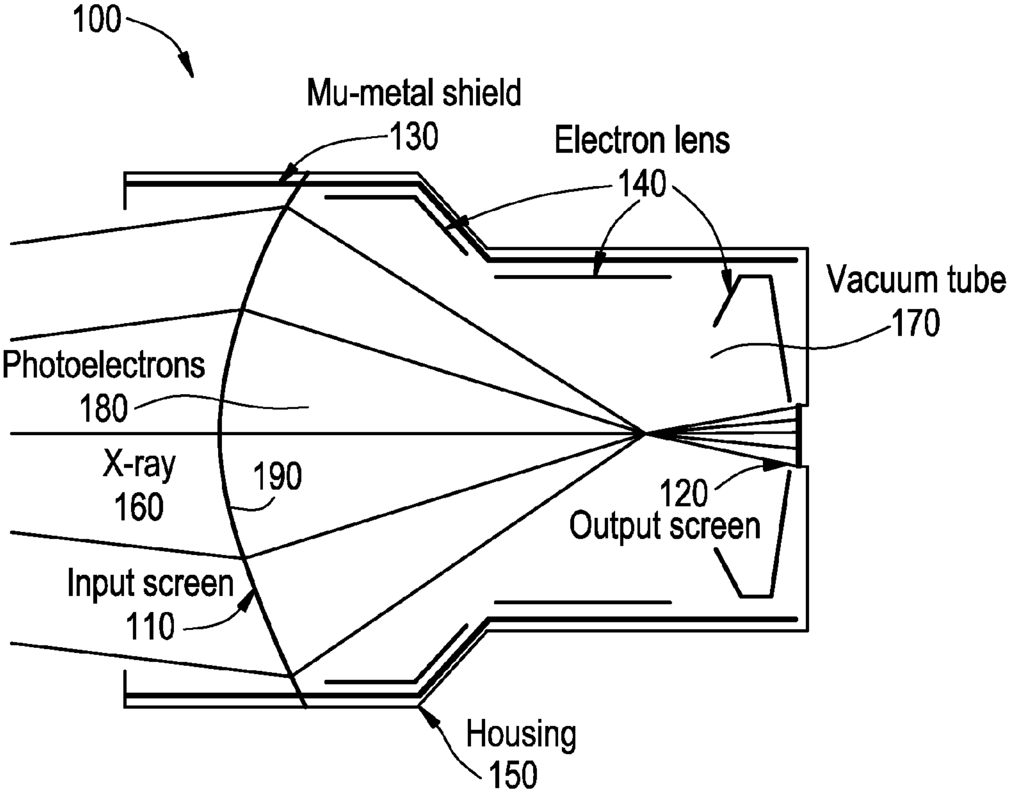
FIG. 1 illustrates a system that is a cross sectional schematic of an image intensifier that may be used in accordance with an embodiment of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

FIG. 1 illustrates a system 100 that is a cross sectional schematic of an image intensifier that may be used in accordance with an embodiment of the present invention. The system 100 may be used as part of a fluoroscopic imaging system to convert the x-ray spectrum transmitted through the patient, into a visible image. The visible image may be produced by converting the x-ray photons 160 into photoelectrons 180 at the image intensifier input screen 110. The shape and choice of material for the input screen 110 may be consistent with design parameters, such as minimizing patient distance, x-ray absorption, x-ray scatter, manufacturing cost, and mechanical strength of materials. The input side of the image intensifier usually has a convex shape and, in an embodiment, may be aluminum. The convex shape of the input screen 110 not only minimizes the patient distance, thus maximizing the useful entrance field size, but it also gives the image intensifier better mechanical strength under atmospheric pressure. In an embodiment, an input screen 110 constructed of aluminum may be approximately 1 mm in thickness.

In FIG. 1, the incoming x-ray photons 160 are shown before the x-ray photons 160 reach the input screen 110. In an embodiment, the input screen 110 may include an input phosphor 190. In an alternative embodiment, the input phosphor 190 may be separate from the input screen 110. The x-ray photons 160 transmitted through the input screen 110 are converted into photoelectrons 180 by the input phosphor 190. The input screen 110 may be a substrate made of aluminum coated with a phosphor layer, an intermediate coupling layer, and a photocathode layer, for example. The thickness of the input phosphor layer is generally a design compromise between spatial resolution and x-ray absorption efficiency. For example, the thickness of an input phosphor 190 may measure between 300 and 450 μm, depending on the image intensifier type and technology used.

The photoelectrons 180 emitted at the input phosphor 190 may be accelerated under the electric fields generated by the electron lens 140 to reach the output screen 120. The electron lens 140 is used, for example, to focus down the photoelectrons 180 to the size of the output screen 120. In general, the number of photoelectrons 180 within the image intensifier 100 does not increase, however the speed of the photoelectrons generally does increase. In general, the electron lens 140 is sensitive to external electrical and magnetic fields. Extraneous electrical and magnetic fields, such as the earth's magnetic field for example, may exert a force on the photoelectrons 180, altering the path of the photoelectrons 180. The altered path of the photoelectrons 180 may cause image distortions in the image intensifier 100, such as for example, the S-distortion.

A single or multiple layer mu-metal shield 130 may be used around the vacuum tube 170 and within the vacuum tube housing 150. As shown in FIG. 1, the x-ray image intensifier is enclosed in the vacuum tube housing 150 which may partially consist of lead to absorb scattered radiation. The mu-metal shield 130 may attempt to shield the electron lens 140 from extraneous magnetic fields. As discussed above, however, the mu-metal shield 130 is often insufficient in shielding the electron lens 140 from extraneous magnetic fields.

Figure 2:
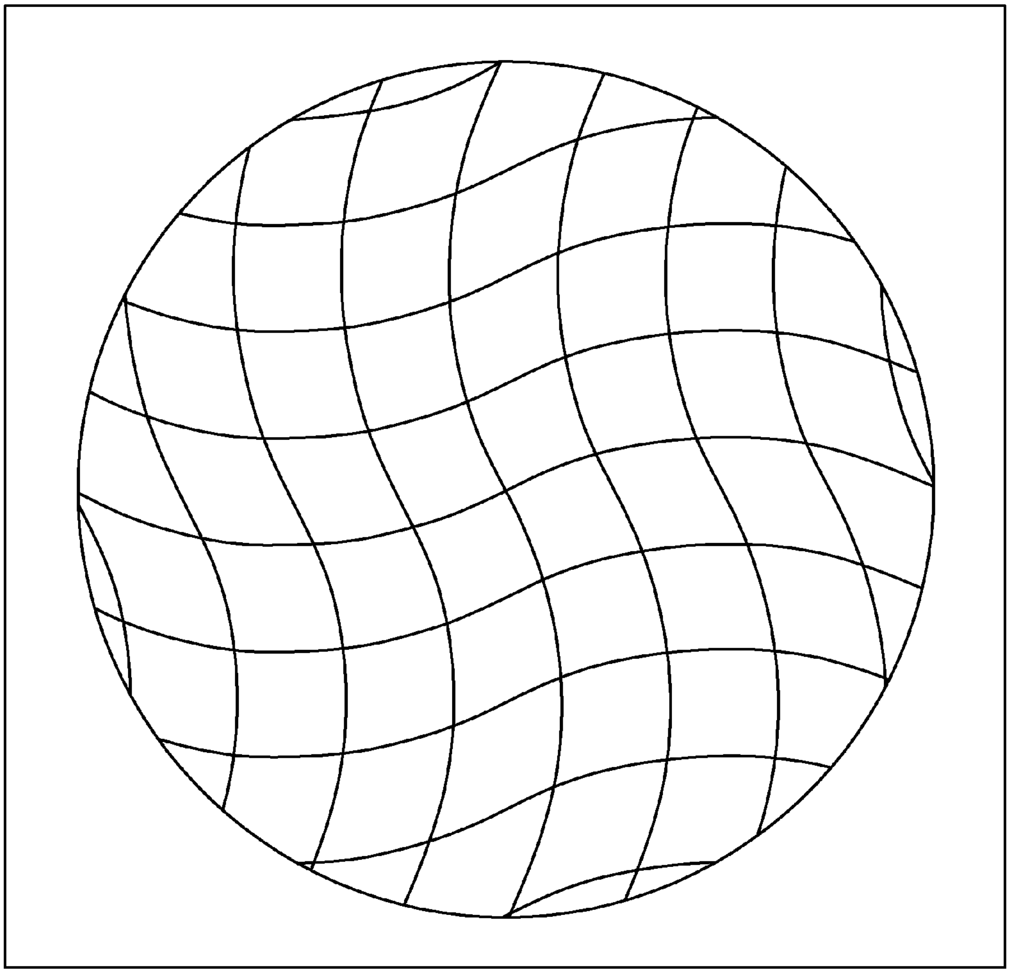
FIG. 2 illustrates an example of an S-distortion pattern.

As discussed above, extraneous magnetic fields, such as the Earth's magnetic field may cause S-distortion. As the photoelectrons 180 within the image intensifier 100 may move in paths along designated lines of flux, the external magnetic field may affect the path of the photoelectrons 180. This characteristic may cause the image in a fluoroscopic system to distort with an S shape. The S-distortion pattern is shown in FIG. 2.

Figure 3:
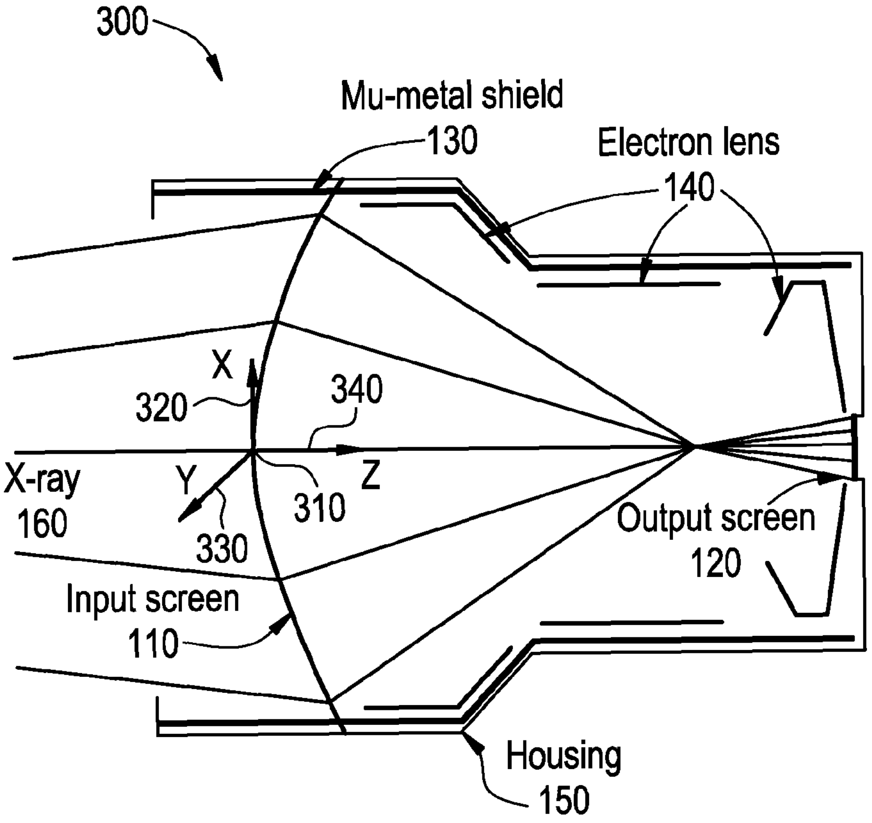
FIG. 3 illustrates a system to model the S-distortion in accordance with an embodiment of the present invention.

FIG. 3 illustrates a system 300 to model the S-distortion in accordance with an embodiment of the present invention. Once the S-distortion is modeled, navigation components, for example, may be calibrated to compensate for the S-distortion. The system 300 illustrates similar components to the system 100. The input-screen 110 and output screen 120 are shown. The mu-metal shield 120, electron lens 140, vacuum tube housing 150, and x-ray photons 160 are also shown.

In order to model the S-distortion in accordance with an embodiment of the present invention, reference coordinate 310 having an x-axis 320, y-axis 330, and z-axis 340 are identified. The configuration of the reference coordinate 310 and associated (x, y, z) vectors is an example, and other coordinate systems may be used. As shown in FIG. 3, the reference coordinate 310 is identified on the input screen 110 of the image intensifier. In an embodiment, the reference point 310 may be in the center of the input screen 110. The z-axis 340 intersects with the reference coordinate 310 and is perpendicular to the input screen 110 at the location of the reference point 310. The x-axis 320 intersects with the reference coordinate 310 and is perpendicular to the z-axis 340. The y-axis 330 intersects the reference coordinate 310 and is perpendicular to the x-axis 320.

Figure 4:
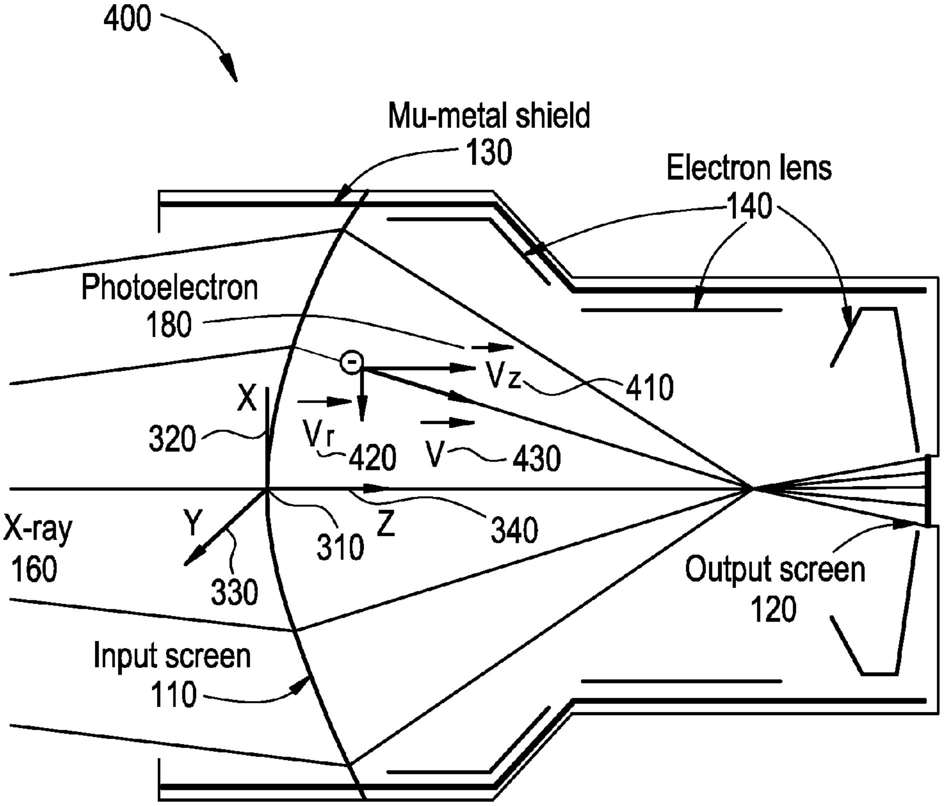
FIG. 4 illustrates a system to model the S-distortion in accordance with an embodiment of the present invention.

FIG. 4 illustrates a system 400 to model the S-distortion in accordance with an embodiment of the present invention. The system 400 illustrates similar components as the system 300, with the addition of the display of a set of charged particle velocity vectors for photoelectron 180. In an embodiment, the charged particle velocity vector V 430 may include a first component for the velocity of a charged particle along the z-axis Vz 410. The charged particle velocity vector V 430 may also include a second component for the velocity of a charged particle in the x-y plane that is along the x-axis and y-axis Vr 420. A set of charged particle velocity vectors may include Vz 410 and Vr 420. Given the dimension information of the input screen 110, for example the radius R of the input screen 110, and a point (X, Y, 0) on the x-y plane, we can state the following:

$$r=\mathrm{sqrt}(X^\wedge 2+Y^\wedge 2) \quad \text{Equation 1}$$

$$Vz=\mathrm{sqrt}(R^\wedge 2-r^\wedge 2)/R \quad \text{Equation 2}$$

$$Vr=r/R \quad \text{Equation 3}$$

It should be noted that both Vz 410 and Vr 420 are normalized velocity functions. The component Vz 410 has a maximum value at the center of the input screen 110 and decays as it approaches the periphery of the image intensifier. The component Vr 420 has a maximum value at the periphery of the input screen 110, and decays as it approaches the center of image intensifier.

Figure 5:
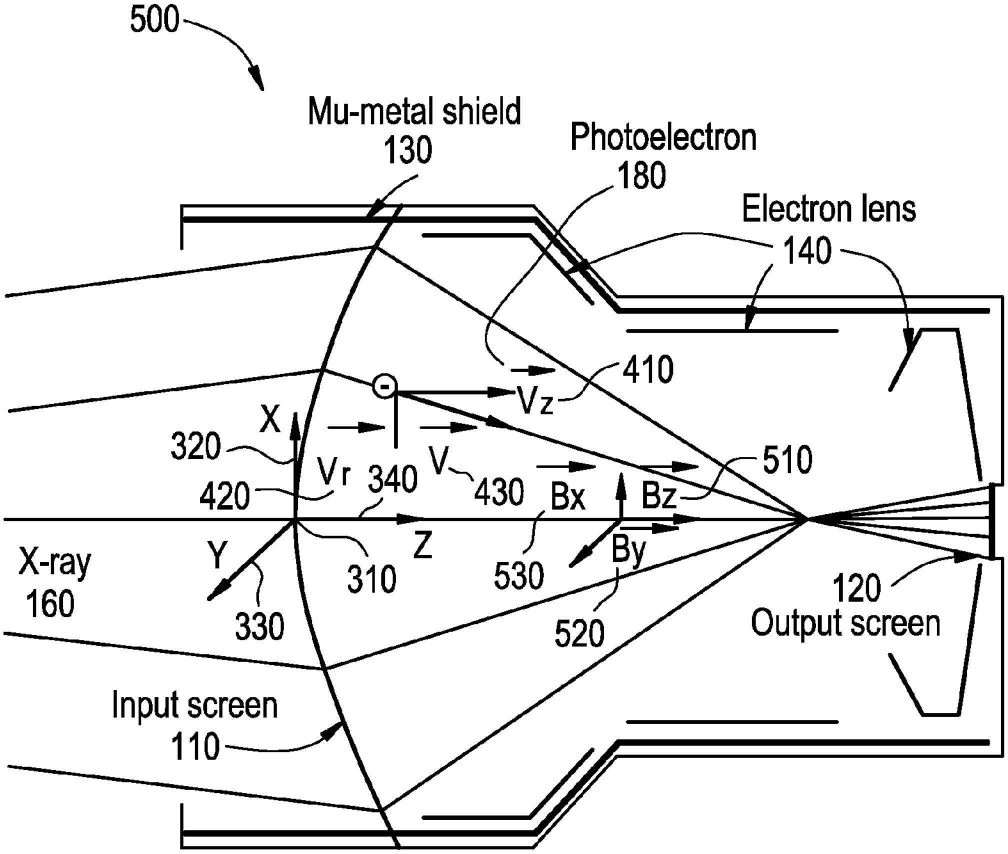
FIG. 5 illustrates a system to model the S-distortion in accordance with an embodiment of the present invention.

FIG. 5 illustrates a system 500 to model the S-distortion in accordance with an embodiment of the present invention. The system 500 illustrates similar components as the system 400, with the addition of the set of magnetic field vectors. The set of magnetic field vectors may represent the extraneous electric or magnetic field. In an embodiment, the set of magnetic field vectors may include a first component for the magnetic field within the image intensifier along the z-axis, Bz 510. The set of magnetic field vectors may also include a second component for the magnetic field within the image intensifier along the y-axis, By 520. The set of magnetic field vectors may also include a third component for the magnetic field within the image intensifier along the x-axis, Bx 530.

The extraneous magnetic or electric fields may be a result from the interactions between the Earth's magnetic field and the mu-shield 130. The magnetic shielding effectiveness may increase at the outer circumference of the image intensifier where the mu-metal shield 130 is in place. The strength of the residual Earth's magnetic field may decrease from the center of the input screen 110 to the edge of the image intensifier, for example as a first order function of the distance to the center of input screen. A second or faster attenuation function is used to model the increased magnetic shielding effectiveness at the periphery of the input screen. The decay functions for the set of magnetic field vectors may be as follows:

$$Bx=Ct^*\cos(\text{theta})^*(1-r/R) \quad \text{Equation 4}$$

$$By=Ct^*\sin(\text{theta})^*(1-r/R) \quad \text{Equation 5}$$

$$Bz=Ce^*(1-r/R)+Cs^*(r/R)^\wedge 2 \quad \text{Equation 6}$$

where the Ct, Ce, and Cs are field attenuation coefficients. The theta parameter is the angle between the transverse magnetic field vector, generally the vector in the x-y plane, and the x-axis 320.

In order to model the S-distortion in the image intensifier, the direction and strength of the force exerted on a charged particle in the image intensifier along the x-y plane may be estimated. In order to perform this estimation, the set of charged particle velocity vectors and the set of magnetic field vectors may be used. The results of the Equations 1-6 may be utilized as follows:

$$f(x)=Bx^*Vz+y^*Bz^*Vr=Ct^*\cos(\text{theta})^*(1-r/R)^*\mathrm{sqrt}(R^\wedge 2-r^\wedge 2)/R+y^*(Ce^*(1-r/R)+Cs^*(r/R)^\wedge 2)^*r/R \quad \text{Equation 7}$$

$$f(y)=By^*Vz-x^*Bz^*Vr=Ct^*\sin(\text{theta})^*(1-r/R)^*\mathrm{sqrt}(R^\wedge 2-r^\wedge 2)/R-x^*(Ce^*(1-r/R)+Cs^*(r/R)^\wedge 2)^*r/R \quad \text{Equation 8}$$

Equation 7 computes the S-distortion along the x-axis 320 and Equation 8 computes the S-distortion along the y-axis 330. Specifically, the first terms Bx*Vz in Equation 7 and By*Vz in Equation 8 correspond to the shift components of the S-distortion on the x-y imaging plane. The second terms y*Bz*Vr in Equation 7 and −x*Bz*Vr in Equation 8 are the tangential components of the S-distortion.

Figure 6:
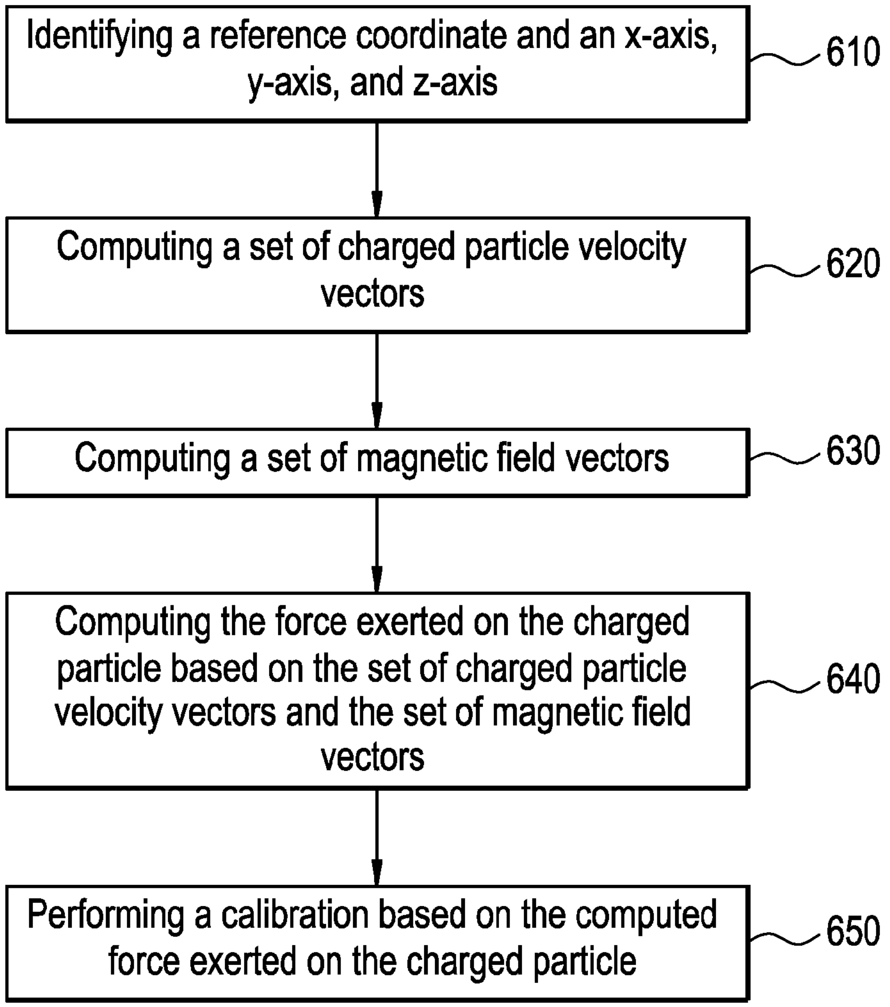
FIG. 6 illustrates a method for modeling the S-distortion in an image intensifier in accordance with an embodiment of the present invention.

FIG. 6 illustrates a method for modeling the S-distortion in an image intensifier in accordance with an embodiment of the present invention. At step 610, a reference coordinate and x-axis, y-axis, and z-axis are identified. In an embodiment, the reference coordinate is identified on the input screen of the image intensifier. The z-axis intersects the reference coordinate and is perpendicular to the input screen at the location of the reference coordinate. In an embodiment, the x-axis intersects the reference coordinate and is perpendicular to the z-axis. In an embodiment, the y-axis intersects the reference coordinate and is perpendicular to the x-axis.

At step 620, a set of charged particle velocity vectors may be computed. The set of charged particle velocity vectors may include a first component for the velocity of the charged particle along the z-axis and a second component for the velocity of the charged particle in an x-y plane that is along the x-axis and y-axis. The charged particle velocity vectors may be computed based on Equations 1-3, defined above.

At step 630, a set of magnetic field vectors is computed. The magnetic field vectors include a first component for the magnetic field within the image intensifier along the z-axis, a second component for the magnetic field within the image intensifier along the x-axis, and a third component for the magnetic field within the image intensifier along the y-axis. The magnetic field vectors may be computed based on Equations 4-6, defined above.

At step 640, the force exerted on a charged particle in an image intensifier is computed. The force exerted on a charged particle is computed for the x-y plane. The force is computed using at least the set of charged particle velocity vectors and said set of magnetic field vectors. In an embodiment, the force exerted on a charged particle computed at step 640 corresponds to the S-distortion force in the image intensifier. The force exerted on a charged particle in an image intensifier may be computed based on Equations 7-8.

At step 650, a calibration may be performed based on the computed force exerted on the charged particle in step 640. The calibration may compensate for the computed force in step 640, for example, the S-distortion force. The image acquisition system may be calibrated to compensate for the S-distortion.

Figure 7:
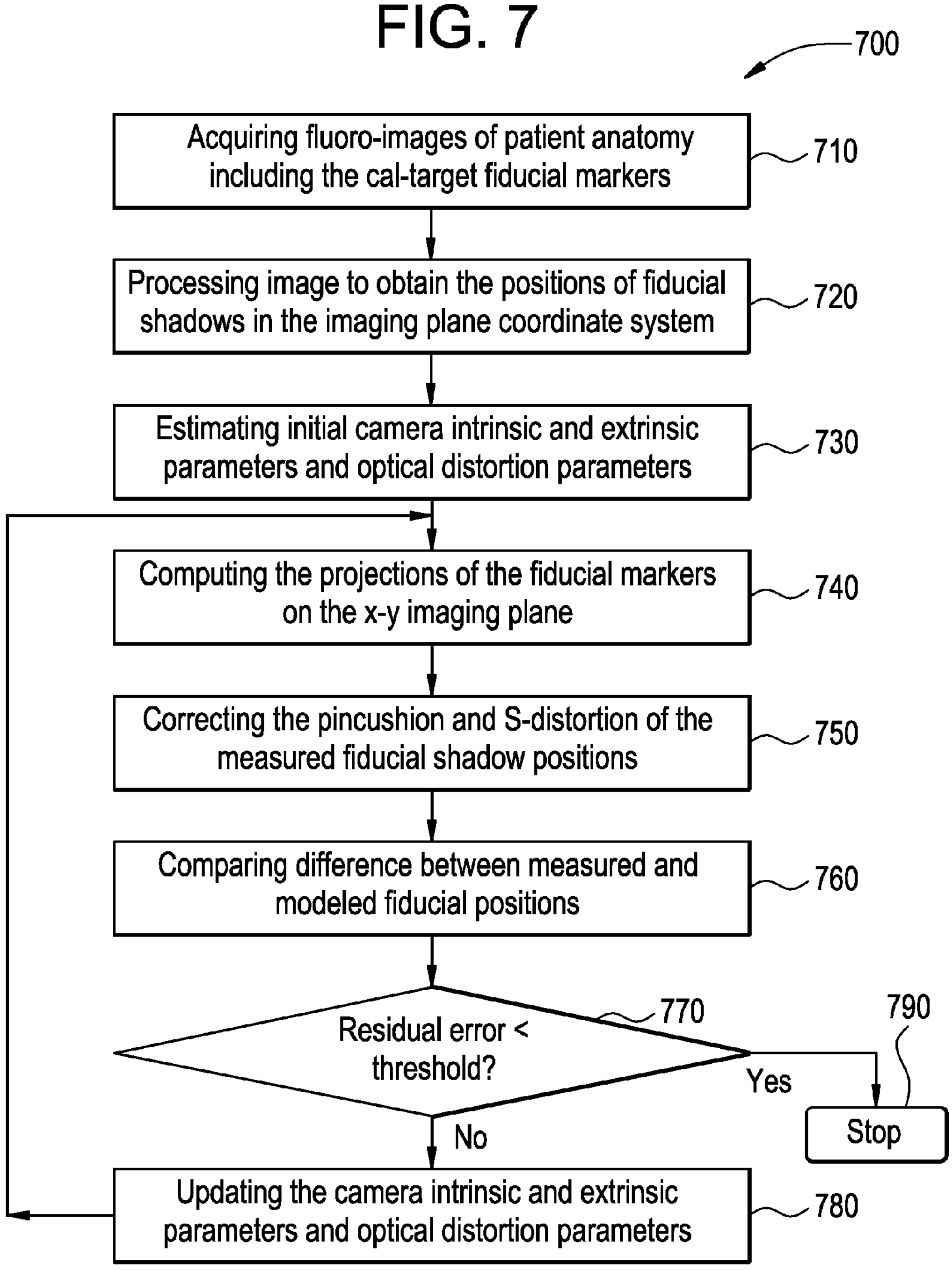
FIG. 7 illustrates a method for calibrating an image acquisition system with an analytic S-distortion model for solving optical distortion and camera projection parameters in accordance with an embodiment of the present invention.

FIG. 7 illustrates a method 700 for calibrating an image acquisition system with an analytic S-distortion model for solving optical distortion and camera projection parameters in accordance with an embodiment of the present invention. At step 710, a set of x-ray images may be acquired. In an embodiment, the x-ray images may be acquired during a surgical procedure. The x-ray images may include both the patient anatomy and the fiducial markers embedded within the calibration target.

At step 720, software processes the x-ray images. The shadows of the fiducial markers may be extracted from the images. The image pixel positions of the detected fiducial shadows may be estimated in an x-y imaging coordinate system.

At step 730, an initial estimate is made for the intrinsic camera parameters. The intrinsic camera parameters may include, for example, focal length, piercing points, and scaling factor. An initial estimate may also be made for extrinsic camera parameters. The extrinsic camera parameters may include, for example, calibration target fiducial positions in the camera coordinate system. An initial estimate may also be made for optical distortion parameters. The optical distortion parameters may include, for example, one pincushion distortion parameter, four S-distortion parameters, Ce, Ct, Cs, and theta in Equations 7 and 8.

At step 740, a set of model fiducial positions is computed in the x-y imaging plane based on the intrinsic and extrinsic camera parameters. At step 750, the pincushion and S-distortion are removed from the measured or acquired fiducial positions. The S-distortion modeling is performed as described above.

At step 760, the difference between the modeled and measured fiducial positions (distortion-free) is compared to a pre-defined threshold.

At step 770, if the residual error is greater than the threshold, the software updates the intrinsic and extrinsic camera parameters as well as the optical distortion parameters at step 780 and starts over at step 740 for the next iteration cycle.

If the residual error is less than the threshold, the software stops at step 790 and outputs the final optical distortion parameters for use in linearizing the acquired fluoro-images. The intrinsic and extrinsic camera parameter outputs may be used for medical navigation applications to project the instrument tips on the linearized images.

The system and method 600 described above may be carried out as part of a computer-readable storage medium including a set of instructions for a computer. The set of instructions may include an identification routine for identifying a reference coordinate and x-axis, y-axis, and z-axis. In an embodiment, the reference coordinate is identified on the input screen of the image intensifier. The z-axis intersects the reference coordinate and is perpendicular to the input screen at the location of the reference coordinate. In an embodiment, the x-axis intersects the reference coordinate and is perpendicular to the z-axis. In an embodiment, the y-axis intersects the reference coordinate and is perpendicular to the x-axis.

The set of instructions may also include a first computation routine for computing a set of charged particle velocity vectors. The set of charged particle velocity vectors may include a first component for the velocity of the charged particle along the z-axis and a second component for the velocity of the charged particle in an x-y plane that is along the x-axis and y-axis. The charged particle velocity vectors may be computed based on Equations 1-3, defined above.

The set of instructions may also include a second computation routine for computing magnetic field vectors. The magnetic field vectors include a first component for the magnetic field within the image intensifier along the z-axis, a second component for the magnetic field within the image intensifier along the x-axis, and a third component for the magnetic field within the image intensifier along the y-axis. The magnetic field vectors may be computed based on Equations 4-6, defined above.

The set of instructions may also include a third computation routine for computing the force exerted on a charged particle in an image intensifier. The force exerted on a charged particle is computed for the x-y plane. The force is computed using at least the set of charged particle velocity vectors and said set of magnetic field vectors. In an embodiment, the force exerted on a charged particle by the third computation routine corresponds to the S-distortion force in the image intensifier. The force exerted on a charged particle in an image intensifier may be computed based on Equations 7-8.

The set of instructions may also include a calibration routine for performing a calibration based on the computed force exerted on the charged particle in the third computation routine. The calibration may compensate for the computed force in the third calibration routine, for example, the S-distortion force. The image acquisition system may be calibrated to compensate for the S-distortion.

The system and method 700 described above may be carried out as part of a computer-readable storage medium including a set of instructions for a computer. The set of instructions may include an acquisition routine for acquiring x-rays. In an embodiment, the x-ray images may be acquired during a surgical procedure. The x-ray images may include both the patient anatomy and the fiducial markers embedded within the calibration target.

The set of instructions may also include a processing routine for processing the x-ray images. The shadows of the fiducial markers may be extracted from the images. The image pixel positions of the detected fiducial shadows may be estimated in an x-y imaging coordinate system.

The set of instructions may also include an estimation routine. An initial estimate is made for the intrinsic camera parameters. The intrinsic camera parameters may include, for example, focal length, piercing points, and scaling factor. An initial estimate may also be made for extrinsic camera parameters. The extrinsic camera parameters may include, for example, calibration target fiducial positions in the camera coordinate system. An initial estimate may also be made for optical distortion parameters. The optical distortion parameters may include, for example, one pincushion distortion parameter, four S-distortion parameters, Ce, Ct, Cs, and theta in Equations 7 and 8.

The set of instructions may also include a computation routine for modeling the fiducial positions in the x-y imaging plane based on the intrinsic and extrinsic camera parameters. The set of instructions may also include a removal routine for removing the pincushion and S-distortion from the measured or acquired fiducial positions. The S-distortion modeling is performed as described above.

The set of instructions may also include computing the difference between the modeled and measured fiducial positions (distortion-free) and comparing that difference to a predefined threshold.

The set of instructions may also include a comparison routine for comparing the residual error to the threshold. If the residual error is greater than the threshold, the software updates the intrinsic and extrinsic camera parameters as well as the optical distortion parameters, and then the set of instructions prepares for the next iteration cycle. If the residual error is less than the threshold, the set of instructions outputs the final optical distortion parameters for use in linearizing the acquired fluoro-images. The intrinsic and extrinsic camera parameter outputs may be used for medical navigation applications to project the instrument tips on the linearized images.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A method for calibrating an image acquisition system with an analytic S-distortion model, said method comprising:

(a) acquiring a set of images, wherein said images include patient anatomy and fiducial markers embedded within a calibration target;

(b) processing said images to obtain measured fiducial markers shadow positions in imaging plane coordinates;

(c) estimating image acquisition system intrinsic parameters, image acquisition system extrinsic parameters, and optical distortion parameters based on the measured fiducial markers shadow positions;

(d) computing a set of model fiducial markers positions in an imaging plane based on the estimated image acquisition system intrinsic parameters and image acquisition system extrinsic parameters;

(e) correcting for the S-distortion and pincushion distortion of the measured fiducial markers shadow positions;

(f) computing the difference between the measured fiducial markers shadow positions and the model fiducial positions;

(g) comparing the difference between the measured fiducial shadow positions and the model fiducial positions with a threshold value, if said difference is greater than the threshold value, the image acquisition system intrinsic parameters, the image acquisition system extrinsic parameters, and the optical distortion parameters are updated and used as input for step d) in the next iteration cycle;

(h) if said difference is less than the threshold value, the optical distortion parameters are used for linearizing said set of acquired images.

2. The method of claim 1, wherein said image acquisition system intrinsic parameters include focal length, piercing points, and scaling factor.

3. The method of claim 1, wherein said image acquisition system extrinsic parameters include calibration target fiducial positions.

4. The method of claim 1, wherein said optical distortion parameters include field attenuation coefficients.

* * * * *